W. A. TURBAYNE.
AUTOMATIC REGULATOR.
APPLICATION FILED DEC. 31, 1912. RENEWED SEPT. 13, 1918.
1,314,166.
Patented Aug. 26, 1919.
2 SHEETS—SHEET 2.
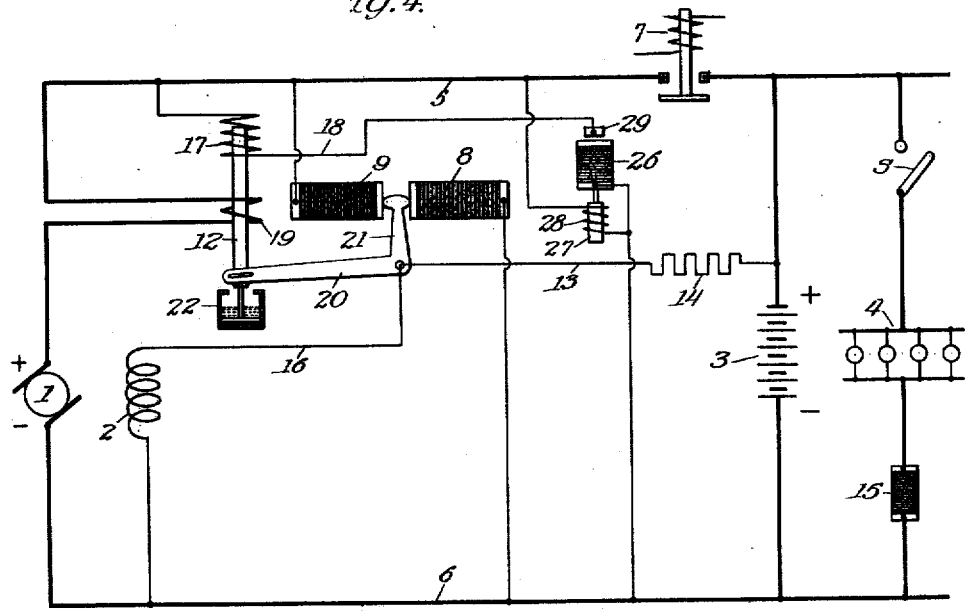
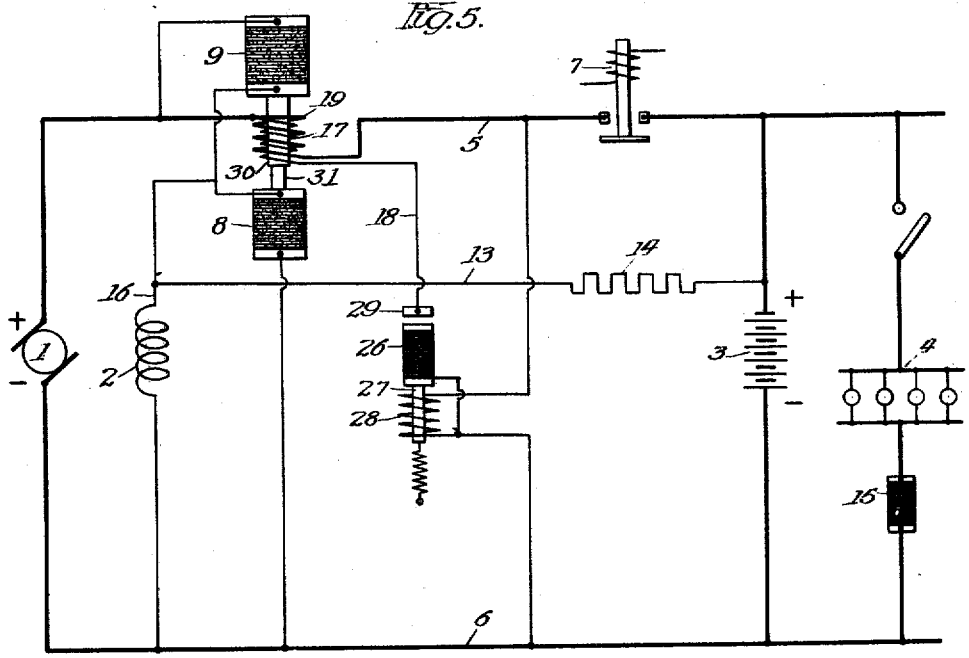
Witnesses:
Robert F. Weir
R. H. Van Nest
Inventor.
William A. Turbayne.
by Edwin B. H. Tower Jr.
Atty

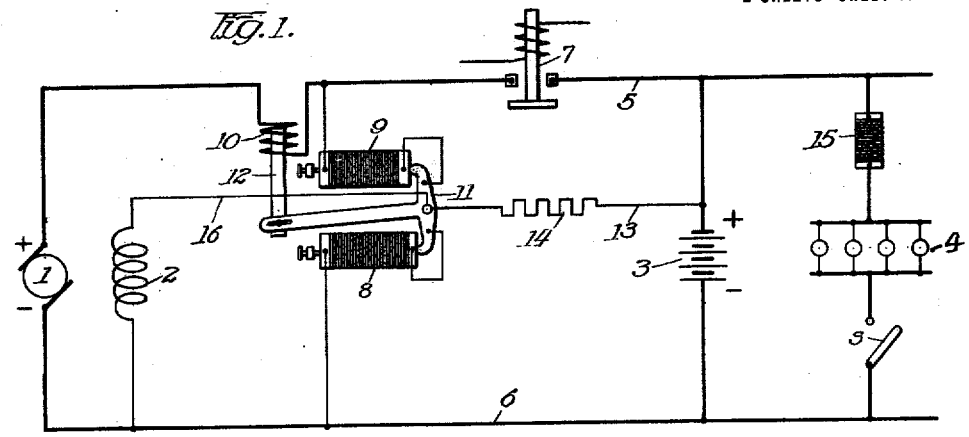
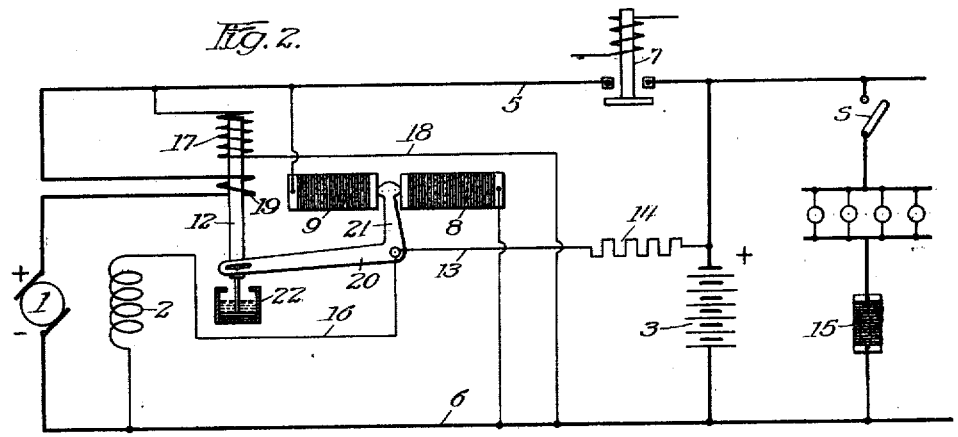
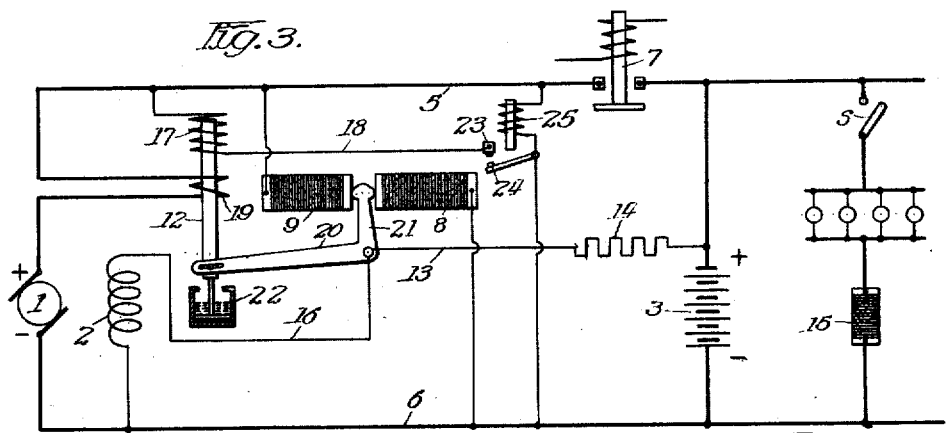

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

AUTOMATIC REGULATOR.

1,314,166.      Specification of Letters Patent.      Patented Aug. 26, 1919.

Application filed December 31, 1912, Serial No. 739,434. Renewed September 13, 1918. Serial No. 253,983.

*To all whom it may concern:*

Be it known that I, WILLIAM A. TURBAYNE, a citizen of the United States, residing at Niagara Falls, in the county of Niagara and State of New York, have invented new and useful Improvements in Automatic Regulators, of which the following is a full, clear, concise, and exact description, reference being had to the accompanying drawing, forming a part of this specification.

This invention relates to improvements in automatic regulators.

This regulator is especially adapted for use on variable speed generators such as are employed in car lighting systems in which a storage battery, maintained in a charged condition by the generator, is employed to light the lamps when the generator is operating at low speed or is at rest.

An object of the invention is to provide a regulator effectively operating throughout extremely wide speed variations of the generator with a very slight movement of the regulator operating members.

Another object of the invention is to provide a regulator which is particularly stable in operation at the extremely high speeds at which a generator in such a system is ordinarily operated.

Another object is to provide a regulator which will automatically regulate the generator during charging of the battery and after the battery has become fully charged.

Another object of the invention is to provide a regulator in which a plurality of compressible rheostats are employed, so arranged as to be readily operated by means of a minimum number of operating parts.

Various arrangements for carrying out these and other objects of the invention are illustrated in the accompanying drawings, in which:

Figure 1 illustrates diagrammatically a regulator for maintaining constant generator current.

Fig. 2 illustrates diagrammatically a regulator providing a tapered battery charging current.

Figs. 3, 4 and 5 illustrate diagrammatically regulators adapted to reduce the generator output to permit the battery to float across the mains when fully charged.

Fig. 1 illustrates a variable speed generator provided with an armature 1 and a shunt field 2. A storage battery 3 and lamps or other translating devices 4 are connected in parallel branches across the generator leads 5 and 6. An automatic switch 7, of any preferred type, may be arranged in one of the generator leads to connect the generator to the system when the generator voltage substantially equals the battery voltage.

A compressible rheostat 8 in shunt to the generator field and a second compressible rheostat 9 in series with the field and the rheostat 8 coöperate to determine the field excitation. A solenoid 10 in series with the generator controls the operation of these rheostats by means of a double-armed bell crank lever 11 pivoted to the core 12 of the solenoid. The operating parts normally assume a position to increase to a maximum the resistance of rheostat 8 and to reduce to a minimum the resistance of rheostat 9.

A conductor 13 containing a resistance 14 provides for initially exciting the generator field from the battery when the automatic switch is open.

Any convenient automatic resistance or other regulating means 15 may be arranged in the lamp circuit to protect the lamps and provide for uniform illumination. A switch *s* controls the lamp circuit.

The regulating elements have been illustrated and described as compressible rheostats. It is to be understood, however, that other forms of resistance elements may be substituted therefor.

The regulating system as illustrated in Fig. 1 operates substantially as follows: With the generator at rest the automatic switch 7 will be open and the battery 3 will supply the load. The generator field 2 will be weakly energized from the battery through a circuit composed of conductor 13, resistance 14, conductor 16, shunt field 2 and lead 6 back to the battery. As the generator starts its field will build up rapidly until the generator voltage reaches substantially the battery voltage when the automatic switch will close. Any excess of current above a predetermined limit which may be due to excessive generator speed, depleted battery condition, heavy load or other causes, will affect the solenoid 10 causing it to operate the bell crank lever 11 to decrease the resistance 8 in shunt to the field and simultaneously increase resistance 9 in series with the field thereby decreasing the field strength and, consequently, the generator output.

Fig. 2 illustrates a modification. In this modification the main operating coil 17 for the regulator is connected across the mains 5 and 6 by conductor 18. The action of coil 17 is modified by the action of a series coil 19 of few turns connected to act accumulatively with coil 17 on the core 12.

A modified arrangement of the compressible rheostats is shown in this figure. The rheostats are placed end to end and a bell crank lever 20 provided with a single operating arm 21 engaging the adjacent ends of both rheostats provides for simultaneously varying the pressure on the rheostats. A dashpot 22 may be provided to steady the action of the core if desired.

In Fig. 2 the coil 17 causes the regulator to maintain a constant voltage from the generator modified by the current coil 19. By this arrangement, as the battery C. E. M. F. rises as it becomes fully charged, the charging current is automatically tapered.

In Fig 3 an arrangement is illustrated in which the generator output is automatically decreased when the battery reaches a predetermined voltage and the battery is, thereafter permitted to float across the mains. In this modification the circuit of the coil 17 is open at contacts 23 and 24 while the battery is below said predetermined voltage. A relay 25 connected across the generator mains operates to close the contacts 23 and 24 when the system reaches substantially said predetermined voltage across the battery. Up to this point coil 19 provides for current regulation similar to that in Fig. 1. Upon closure of contacts 23 and 24 coil 17 becomes active to reduce the generator voltage sufficiently to enable the battery to float, charging and discharging according to load requirements.

Fig. 4 illustrates a system similar to that in Fig. 3. A modified form of relay is used in this arrangement. A compressible rheostat 26 is arranged for bodily movement with the core 27 of coil 28 connected across the generator mains. A fixed contact 29 is arranged adjacent the free end of the compressible rheostat. This arrangement also provides for reducing the generator voltage to permit the battery to float across the line. When the voltage of the system reaches substantially the predetermined voltage across the battery, the coil 28 raises the plunger 27 and the rheostat 26 to close circuit with contact 29, thereby energizing coil 17. A further tendency to increase in voltage due to increase in generator speed, breaking of a battery connection, or other cause, will result in compression of the rheostat 26 thereby decreasing the resistance in series with coil 17 so as to increase the effectiveness thereof.

Fig. 5 illustrates a system similar to Fig. 4 in which a further modification in the arrangement of the compressible rheostats 8 and 9 is shown. In this modification the rheostats 8 and 9 are placed end to end with a core 30 of magnetic material connecting the adjacent ends. This core is provided with a portion 31 of reduced cross-section. This portion is preferably of non-magnetic material, although when the diameter thereof is relatively small as compared to the diameter of the main portion of the core, the portion 31 may be of magnetic material. Coils 17 and 19 are wound on this core and act, when energized, to compress rheostat 8 and decrease pressure on rheostat 9 as in the other forms.

A spring or other means may be employed in each modification, if desired, to bias the regulator so as to normally exert pressure on rheostat 9 and maintain a minimum pressure on rheostat 8.

In each of the arrangements illustrated a very slight movement of the operating lever or plunger, due to small increases in current in the operating coils, will result in a decided variation in field excitation due to the fact that the resistance in series with the field is increased and simultaneously the resistance in shunt to the field is decreased, thereby diverting more current from the field.

The regulator is stable in operation, especially at high generator speeds when the field magnets are operating at a low flux density, during which the machine would respond to very slight changes in voltage across its field. An inductive circuit, such as the field winding when connected in series with a non-inductive resistance such as the rheostat 9, especially when such resistance is high when compared with the inductive resistance, is very sensitive to variations in impressed voltage. This feature, together with the unstable condition of the magnetic circuit, would make close regulation by a single rheostat difficult at widely varying speeds. The field winding in this regulator being shunted by the non-inductive resistance 8 prevents rapid changes in the magnetic flux in the generator, as any tendency to a rapid change is immediately encountered by the development of an E. M. F. in the field winding which sets up a current through the local circuit, comprising rheostat 8, which tends to retard initial flux changes. The higher the generator speed the less the value of this resistance and, consequently, the apparatus becomes even more stable at the higher speeds than at the lower.

It is apparent that the arrangement of rheostats illustrated in any modification herein described may be substituted for the rheostats in any of the other modifications. It is apparent also that many other modifications and arrangements may be made which fall within the scope of the invention as defined in the appended claims.

What I claim as new and desire to secure by Letters Patent is:

1. In combination, a generator provided with a shunt field winding, a resistance in shunt to said field winding, a second resistance in series with said first mentioned resistance and said field winding, and means responsive at a varying rate to voltage changes across said generator for controlling said resistances.

2. In combination, a generator provided with a shunt field winding, a resistance in shunt to said field winding, a second resistance in series with said first mentioned resistance and said field winding, and a single operating means responsive at a varying rate to voltage changes across said generator for automatically varying said resistances.

3. In combination, a generator provided with a shunt field winding, a variable resistance in series with said field winding, a variable resistance in shunt to said field winding, and a single operating means responsive at a varying rate to voltage changes across said generator for simultaneously varying said resistances.

4. In combination, a generator provided with a shunt field winding, a resistance in series with said field winding, a circuit in shunt to said field winding, said circuit including a variable resistance and means for varying said last named resistance responsive to variations in the current output of the generator and at a varying rate to voltage changes across said generator.

5. In combination with a generator provided with a shunt field winding, a variable resistance in series with said field winding, a variable resistance in shunt to said field winding, and means responsive at a varying rate to voltage changes across said generator for simultaneously increasing said first resistance and decreasing said second resistance.

6. In combination with a variable speed generator provided with a shunt field winding, a variable resistance in series with said field winding, a second variable resistance in shunt to said field winding, and current-operated means, also responsive at a varying rate to voltage changes for simultaneously increasing said first resistance and decreasing said second resistance.

7. In combination with a variable speed generator provided with a shunt field winding, a variable resistance in shunt to said field winding, a variable resistance in series with said resistance and the field winding, a coil in series with the generator, a coil responsive at a varying rate to voltage changes, and means whereby energization of said coils may simultaneously decrease said first resistance and increase said second resistance.

8. In combination with a shunt-wound generator, a compressible rheostat in shunt to the field winding thereof, a compressible rheostat in series with said field winding and said first rheostat, a bell crank lever provided with an operating arm adjacent each compressible rheostat, and current-operated means, also responsive at a varying rate to voltage changes for operating said bell crank lever to simultaneously compress one rheostat and decrease pressure on the other.

9. In combination, a generator having a shunt field winding, a variable resistance in shunt to said field winding, a variable resistance in series with said field winding and said first mentioned resistance, and operating means for simultaneously varying said resistance comprising a coil in series with the generator and a coil responsive at a varying rate to voltage changes across said generator.

10. In combination, a variable speed generator, a storage battery supplied thereby, a variable resistance in series with the generator field winding, a variable resistance in shunt to the generator field winding, and a common operating means for said resistances operating responsive at a varying rate to voltage variations in the system modified by variations in generator current.

11. In combination, a variable speed generator, a storage battery supplied thereby, a variable resistance in series with the generator field winding, a variable resistance in shunt to the generator field winding, a common operating means for said resistances, said operating means including a normally deënergized coil, and means for causing energization of said coil at a varying rate to voltage changes in the system.

12. In combination, a variable speed generator, a storage battery supplied thereby, a variable resistance in series with the generator field winding, a variable resistance in shunt to the generator field winding, a common operating means for said resistances, said operating means including a coil adapted to be connected across the generator leads, said coil being normally deënergized and means for causing energization of said coil at a varying rate to voltage changes in the system.

13. In combination, a variable speed generator, a storage battery supplied thereby, a variable resistance in shunt to the field winding of said generator, a variable resistance in series with said resistance and the generator field winding, a common operating means for simultaneously varying said resistances, said means including a normally open circuited coil adapted to be connected across the generator mains, and a means for controlling the energization of said coil comprising a bodily movable compressible rheostat in series with said coil, and means responsive to a predetermined voltage rise in the system for moving said rheostat to complete the circuit for said coil and on further voltage rise to reduce the resistance in series with said coil.

In witness whereof I have hereunto subscribed my name in the presence of two witnesses.

WILLIAM A. TURBAYNE.

Witnesses:
L. A. PETTEBONE,
JAMES L. COUGHLIN.

Copies of this patent may be obtained for five cents each, by addressing the "Commissioner of Patents, Washington, D. C."